United States Patent [19]

Kittler

[11] 4,094,281
[45] June 13, 1978

[54] RESILIENT THROTTLE STOP MEANS

[76] Inventor: Milton J. Kittler, 48 Casablanca Est's., Scottsdale, Ariz. 85253

[21] Appl. No.: 724,556

[22] Filed: Sep. 20, 1976

Related U.S. Application Data

[62] Division of Ser. No. 522,236, Nov. 8, 1974, Pat. No. 4,016,842.

[51] Int. Cl.² .................. F02D 11/02; G05G 5/04
[52] U.S. Cl. ........................... 123/98; 74/513; 74/526
[58] Field of Search ..................... 123/98; 74/513, 526

[56] References Cited

U.S. PATENT DOCUMENTS 1,977,288  10/1934  Purdy ........................ 74/513 X
3,724,287   4/1973  Dreeben ........................ 74/526

Primary Examiner—Charles J. Myhre
Assistant Examiner—Tony M. Argenbright
Attorney, Agent, or Firm—Lon H. Romanski

[57] ABSTRACT

A variably positionable throttle employed for controlling the flow through induction passage means to related engine means employs, in various embodiments, resiliently deflectable and/or yieldable means which, upon sufficient opening movement of the throttle, present to the vehicle operator a sensory feedback signal that a normally sufficient opening of the throttle has been attained while still permitting such vehicle operator to open even further such throttle valve in the event conditions of driving and/or traffic warrant such additional opening.

7 Claims, 17 Drawing Figures

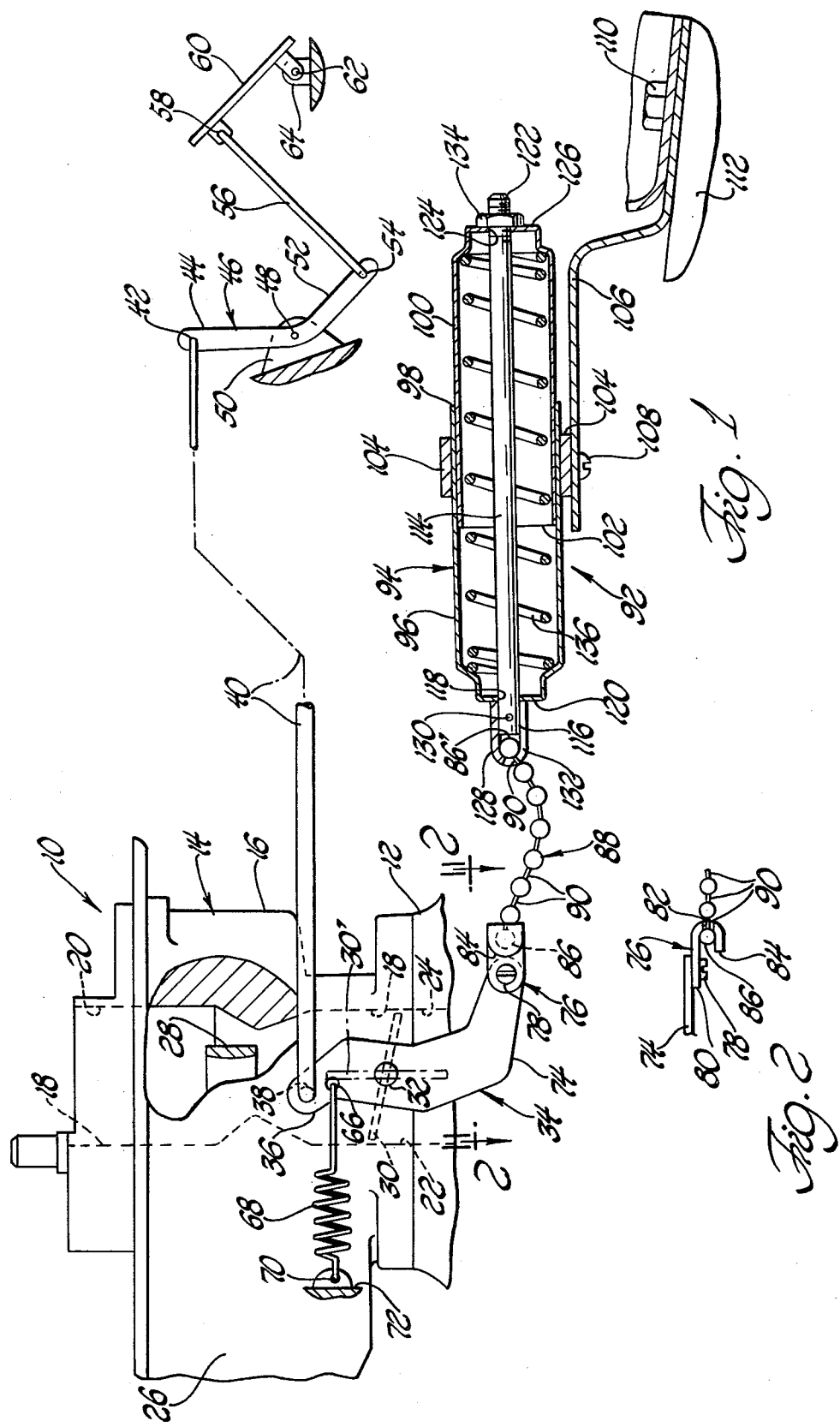

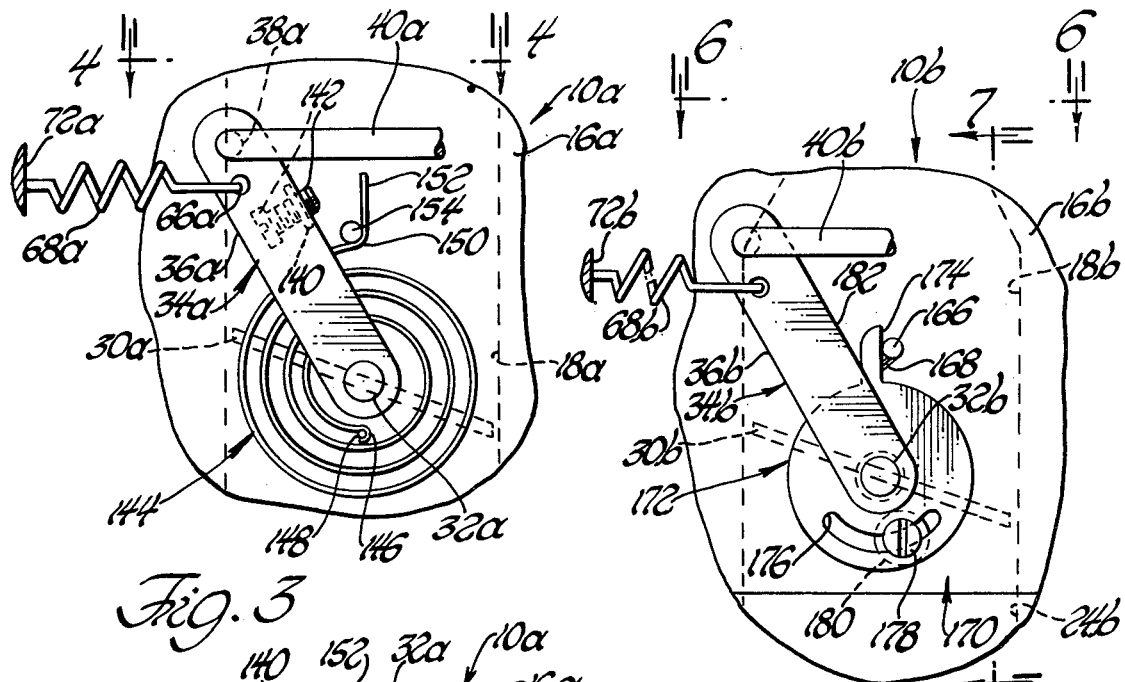
Fig. 3
Fig. 5
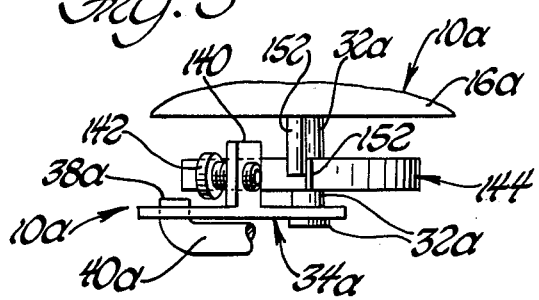
Fig. 4
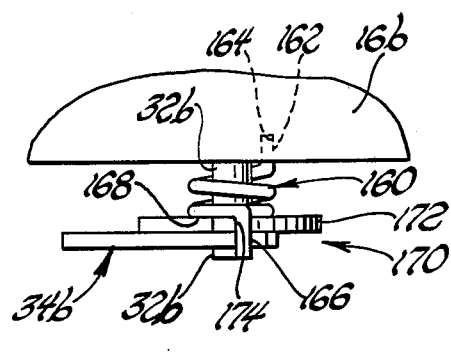
Fig. 6
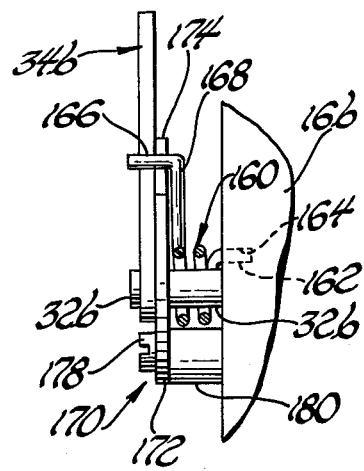
Fig. 7

RESILIENT THROTTLE STOP MEANS

RELATED APPLICATION

This application is a Division of my copending application Ser. No. 522,236, filed Nov. 8, 1974, for "RESILIENT THROTTLE STOP MEANS", now U.S. Pat. No. 4,016,842.

BACKGROUND OF THE INVENTION

Because of the present energy crises and, more particularly, the shortage of gasoline for use in automotive vehicles various devices and apparatus have been heretofore proposed by the prior art for allegedly increasing the mileage which a vehicle will obtain from, for example, a gallon of gasoline.

Such prior art devices have several major disadvantages; that is, for example, such devices: (a) are usually relatively expensive and if even the touted savings in gasoline are realized it would often require many thousands of driving miles in order to recoup the purchase price of such prior art devices; (b) usually require disassembly of engine components and/or engine accessories thereby also incurring additional installation costs which, of course, must also be amortized over additional thousands of driving miles; (c) often require alteration and/or repositioning of engine accessories which, in turn, cause an alteration in the spacing and configuration of, for example, conduits, hoses and linkages which, in turn, may, if not carefully accomplished, result in faulty or unsafe engine operation; and (d) often require the use of a particular fluid or liquid which is sold under a particular label and represented as being a secret mixture of ingredients which provide the results alleged in the advertisements associated with the particular prior art device; this, of course, only adds to the cost of such an alleged fuel-saving device.

It has also been suggested that the use of engine manifold vacuum responsive gauges be employed within the interior of the vehicular passenger compartment so that upon excessive throttle opening the resulting low value of manifold vacuum will cause the gauge indicator needle (or some equivalent structure) to indicate to the vehicle operator that he is operating the vehicle under conditions resulting in an excessive rate of fuel consumption. Such devices prove to be a distraction to the operator and, especially after the novelty thereof wears off, the operator usually no longer pays any attention to it.

None of the prior art devices seem to have recognized that one of the greatest factors in the rate of gasoline consumption by a vehicle is the vehicle operator. That is, without exception if any of the prior art alleged fuel-saving devices did in fact perform in the manner in which they have been represented, the vehicle operator could still nullify such potential gasoline savings through continuing to exercise less than desirable driving habits as, for example, continually requiring maximum engine power output during acceleration, panic type braking and the non-maintaining of a generally stable road speed whenever possible.

It is submitted that, in view of many tests conducted by various independent commercial testing agencies as well as by various independent governmental agencies, the proposed prior art "gas-saving" devices do not, in fact, save any gasoline, and, if after a period of time, a particular vehicle operator has noticed any increase in the mileage obtained per gallon of fuel, such increase is usually traceable to the vehicle operator at least slightly changing his driving habits because he has been made more aware of gasoline consumption merely by the money spent in having such a prior art "gas-saving" device installed on his vehicle.

Accordingly, the invention as herein disclosed and claimed is primarily directed to the solution of the problems of the heretofore proposed prior art devices, as well as other related problems, and to fulfill a need whereby without exorbitant cost, any vehicle, employing an operator-positioned throttle valve, can be provided with means which will intrinsically aid in the reduction of the rate of fuel consumption as well as intrinsically teach the vehicle operator to acquire driving habits conducive to minimization of the rate of fuel consumption.

SUMMARY OF THE INVENTION

According to the invention, a resilient throttle stop apparatus comprises resilient means, and connecting means for operatively connecting said resilient means to a throttle valve of related throttle controlled induction passage means, said connecting means comprising functional lost-motion means effective to cause said resilient means to exhibit added resilient resistance to opening movement of said throttle valve after said throttle valve has been opened to a preselected degree.

Various general and specific objects and advantages of the invention will become apparent when reference is made to the following detailed description, of the preferred embodiments, considered in conjunction with the accompanying drawings.

BRIEF DESCRIPTION OF THE INVENTION

In the drawings, wherein for purposes of clarity certain details and/or elements may be omitted from one or more views:

FIG. 1 is a side elevational view, with certain portions broken away and in cross-section, of a first embodiment of the invention and cooperating structure within an associated vehicle;

FIG. 2 is a fragmentary view taken generally on the plane of line 2—2 of FIG. 1 and looking in the direction of the arrows;

FIG. 3 is a side elevational view illustrating a second embodiment of the invention;

FIG. 4 is a view taken generally on the plane of line 4—4 of FIG. 3 and looking in the direction of the arrows;

FIG. 5 is a side elevational view illustrating another embodiment of the invention;

Figure 8:
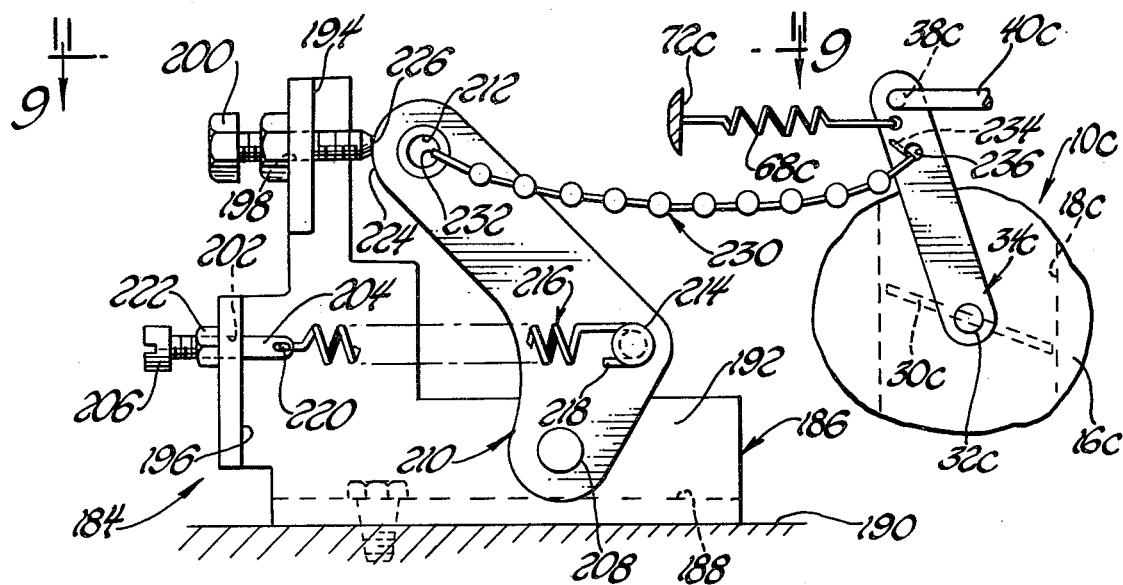
Figure 9:
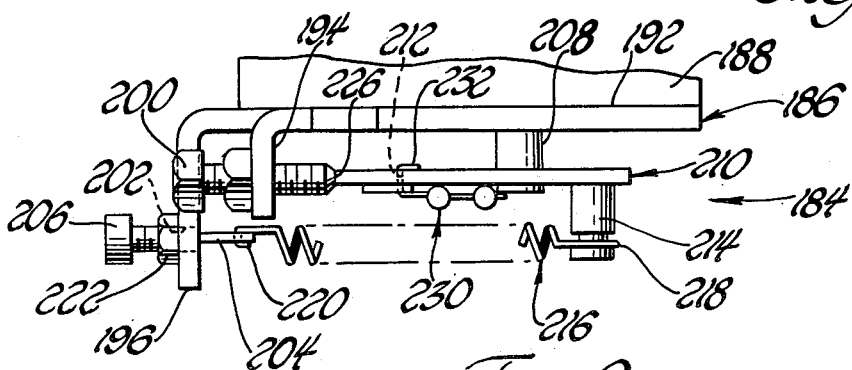
Figure 10:
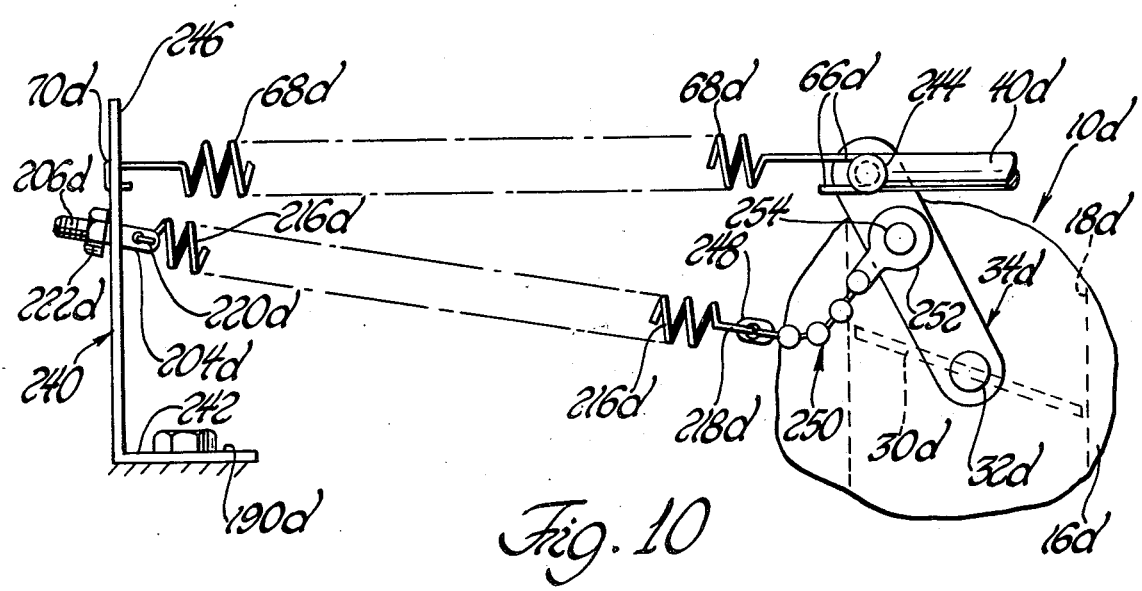
Figure 11:
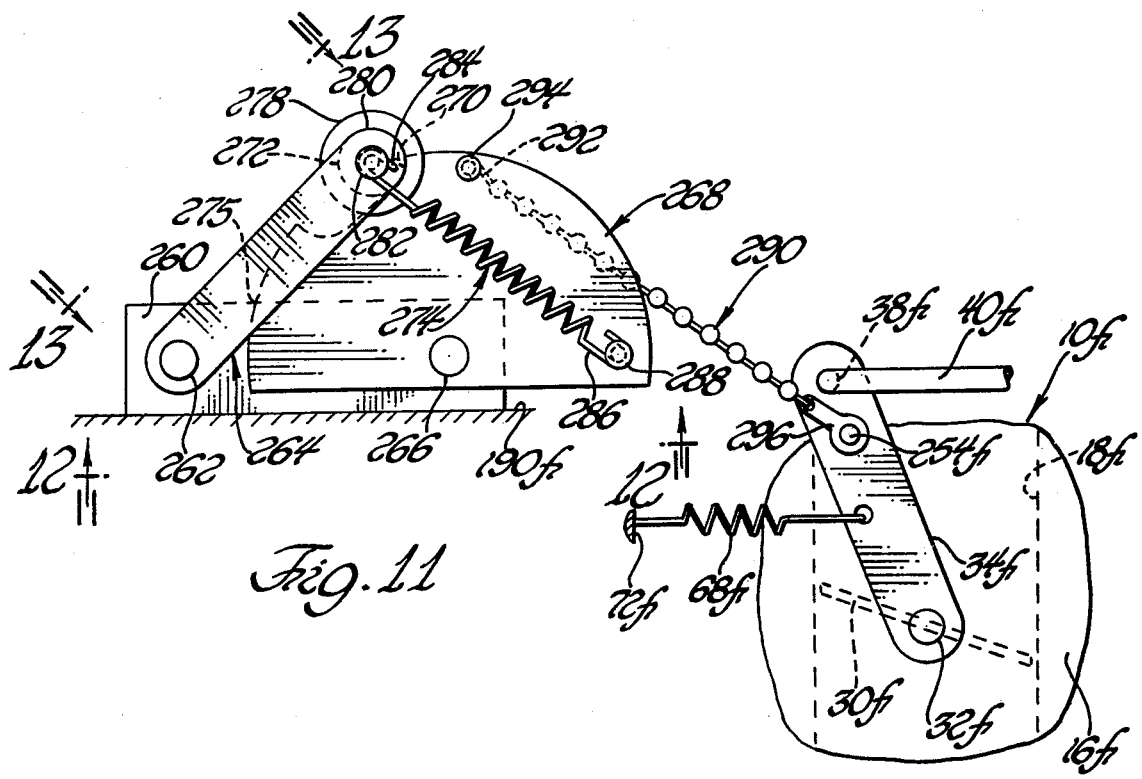
Figure 12:
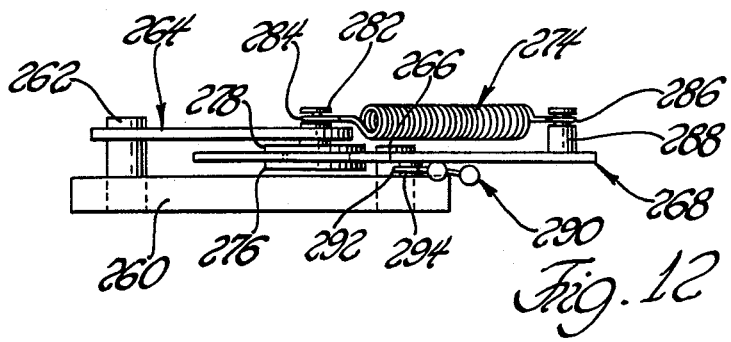
Figure 13:
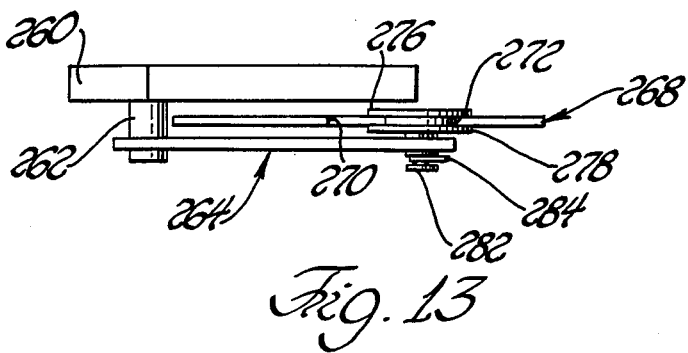
Figure 14:
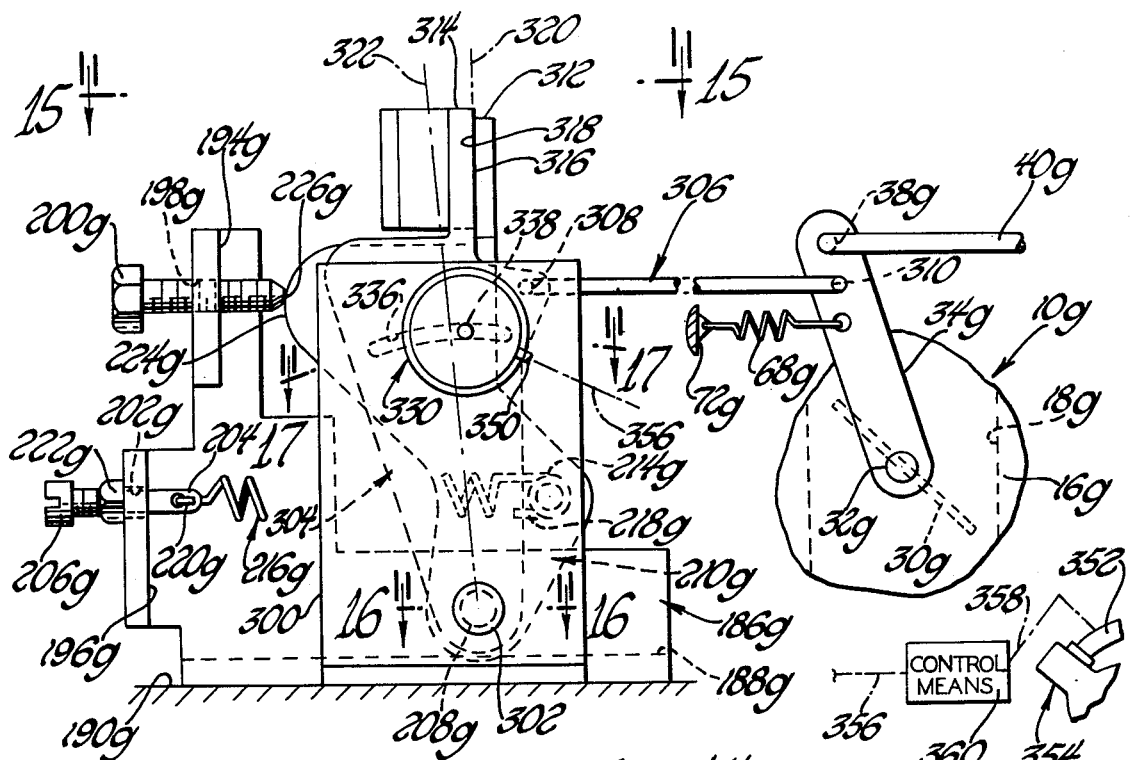
Figure 15:
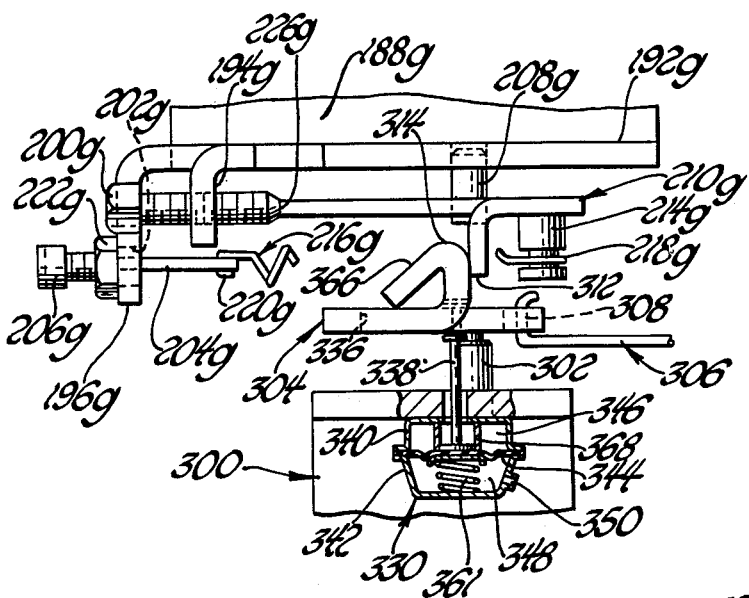
Figure 16:
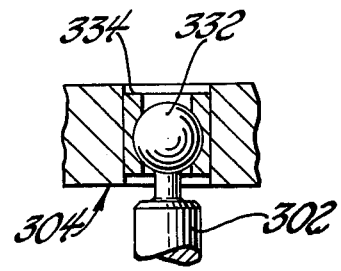
Figure 17:
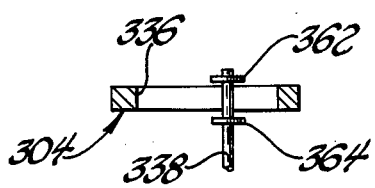

FIGS. 6 and 7 are views respectively taken on the plane of lines 6—6 and 7—7 of FIG. 5 and looking in the direction of the arrows;

FIG. 8 is a side elevational view illustrating a further embodiment of the invention;

FIG. 9 is a view taken generally on the plane of line 9—9 of FIG. 8 and looking in the direction of the arrows;

FIG. 10 is a side elevational view of yet another embodiment of the invention;

FIG. 11 is a side elevational view of another embodiment of the invention;

FIGS. 12 and 13 are views taken respectively on the planes of lines 12—12 and 13—13 of FIG. 11 and looking in the direction of the arrows;

FIG. 14 is a side elevational view of still another embodiment of the invention; and FIGS. 15, 16 and 17 are views respectively taken generally on the planes of lines 15—15, 16—16 and 17—17 of FIG. 14 and looking in the direction of the arrows.

DETAILED DESCRIPTION OF THE PREFERRED EMBODIMENTS

Referring now in greater detail to the drawings, FIG. 1 illustrates an induction apparatus 10 suitably fixedly situated as atop an intake manifold 12 of related engine means. More particularly, in the embodiment shown, the induction apparatus 10 comprises carburetor means 14 having body means 16 with induction passage means 18 formed therethrough and communicating at one end 20 as with a source of air and at an other end 22 with the inlet portion 24 of the intake manifold 12. The carburetor 14 may also comprise a fuel reservoir section or portion 26 from which fuel is metered through related metering means and ultimately discharged into the induction passage means 18 as by a main fuel nozzle 28 or as by an idle and off-idle fuel supply system as is generally well known in the art. Further, as is also well known in the art, the carburetor assembly 14 may be provided with what is commonly referred to as an accelerating pump the function of which is to supply additional quantities of fuel to the engine whenever the associated throttle valve is quickly moved a predetermined minimum distance in the opening direction to thereby compensate for the difference in inertia as between air and fuel and the consequent lag in increased rate of fuel flow compared to the rate of change in the rate of flow of air.

Further, the induction apparatus or carburetor 14, as illustrated, is provided with throttle means 30 situated within induction passage means 18 and operatively carried therein as by suitable throttle shaft means 32 suitably pivotally or rotatably journalled as to be capable of rotating throttle valve 30 from its illustrated nominally closed or curb-idle position to a fully opened or wide-open position as at 30'.

A throttle lever 34, operatively fixedly secured to throttle shaft 32 as to be rotatable therewith, is shown as having an upper arm 36 pivotally connected to end portion 38 of related throttle actuating linkage means 40 which, in turn, has its other end 42 pivotally connected as to arm portion 44 of lever or bellcrank means 46. The lever means 46, which may be pivotally anchored as at 48 to related support structure 50 carried by the associated vehicle, has its other arm 52 pivotally connected as to one end 54 of motion transmitting linkage means 56 which, in turn, is pivotally connected at its opposite end 58 to operator controlled throttle actuating lever or foot-pedal means 60, situated within the passenger compartment of the associated vehicle, and suitably secured for pivotal motion as at 62 to related vehicle-carried support means 64.

The upper arm 36 of throttle lever 34 is shown also operatively connected to one end 66 of a throttle return spring 68 which, in turn, may be suitably anchored as at 70 to related structure 72. The purpose of spring means 68 is to continually resiliently urge the throttle valve means 30 toward its curb-idle or nominally closed position as generally depicted in FIG. 1. In this connection, it should be brought out that the apparatus 14, and in particular shaft 32, may be provided with any suitable means, many of which are well known in the art, for variably determining the permissable degree of throttle closure due especially to engine temperature. That is, for example, in many embodiments of the prior art, the throttle shaft is operatively connected to a lever arm movable therewith and carrying an adjustable abutment member, such as a screw; such abutment member is, in turn, so positioned as to have a path of travel, during throttle-closing movement, which intersects or otherwise includes variably positionable cam-type stop means. The cam-type stop means is usually positionable in response to carburetor choke position and/or engine temperature (as well as other possible indicia of engine operation) so as to generally result in the throttle valve means, when returned to its curb-idle position, being held open a further amount when engine temperature is comparatively low than when the engine has attained its normal operating temperature.

Generally, an inspection of FIG. 1 will show that as the vehicle operator rotates throttle pedal 60 counter-clockwise about pivot 62, linkage 56 causes bellcrank 46 to rotate clockwise about pivot 48 and, in so doing, through linkage means 40, cause throttle lever 34, throttle shaft 32 and throttle valve means 30 to rotate in a clockwise direction, about the centerline of shaft 32, causing throttle valve means 30 to move in the throttle-opening direction toward its wide-open position as at 30'. As the vehicle operator releases throttle pedal 60, spring means 68, through arm 36, causes lever 34, shaft 32 and throttle means 30 to rotate counter-clockwise in the throttle closing direction while, at the same time, through linkage means 40, bellcrank 46 and linkage 56 cause throttle pedal 60 to rotate clockwise about pivot 62 back toward its original position.

As also shown in FIG. 1, throttle lever 34 has a lower arm portion 74 which, as illustrated, may be provided with a generally U-shaped hook member 76 secured to arm 74 as by a screw 78 extending through one leg 80 of member 76. As best shown in FIG. 2, a vertically directed slot 82 is formed generally in the bight portion of the U-shaped member 76 so as to extend in length, for example, half the height of the member 76 as viewed in FIG. 1.

As shown in both FIGS. 1 and 2, member 76 is so formed as to be capable of receiving, generally between opposed legs 80 and 84 thereof, a ball 86, of a ball-type chain motion transmitting linkage 88, while the slot 82 permits the passage of the corresponding chain-link member 90 by which succeeding balls of such chain means 88 are serially interconnected.

FIG. 1 also illustrates auxiliary resilient means 92 operatively connected via linkage means 88 to throttle lever 34 and throttle valve means 30. Means 92 is illustrated as comprising housing means 94 having a first tubular or cup-like housing section 96 with an open end 98 for the slidable telescoping reception of a second tubular or cup-like housing section 100 which also has an open inner disposed end 102. The first or outer housing section 96 is suitably fixedly secured as by suitable clamping or strap means 104 to a mounting bracket 106 as by a screw 108. The bracket 106 is, in turn, fixedly secured as by a screw 110 to related support structure 112 comprising a portion of the associated engine or structure fixedly carried by and secured to such associated engine.

A longitudinally extending rod 114 situated generally within housing means 94 has a first end 116 freely passing or extending through an aperture 118, formed in end 120 of housing section 96, and a second end 122 freely passing or extending through an aperture 124 formed in end 126 of the second or inner housing section 100. A generally tubular cup-like cap member 128 is received about end 116 of rod 114 and secured thereto as by a retaining pin 130. Cap member 128 has a longitudinally extending slot 132 formed therein as to thereby provide for the reception of one of the ball-chain link members 90 which, in turn, is connected to end ball 86', of the chain motion transmitting means 88, recieved and contained generally within cap 128.

In the preferred embodiment of the invention as shown in FIG. 1, end 122 of rod 114 is threaded as to receive thereon a threaded nut 134. Although only one nut 134 is illustrated, it is apparent that a second threaded nut 134 may be provided for locking purposes if such be required or desired.

A coiled compression spring 136, contained within housing means 94, is seated at its opposite ends against generally ends 120 and 126 of respective housing sections 96 and 100 to thereby resiliently urge such housing sections in directions away from each other. Since housing section 96 is secured against movement, any relative motion of such housing sections will be achieved by the movement of housing section 100 and the limit to which housing section 100 will move to the right, as viewed in FIG. 1, will be determined by the abutting action of cap or stop member 128 against end 120 of housing section 96. Further, the preload force of spring 136 may be adjusted by the use of nut 134 and the threaded portion of rod 114 as well as, if needed or desired, the inclusion of shims at either or both ends of spring 136 and between such spring ends and the respective housing sections. As should be apparent, housing section 100 functionally defines a movable spring perch while housing section 96 functionally defines a fixed spring perch.

The assembly 92 is so located and positioned and the length of motion transmitting chain or linkage means 88 is such as to provide for a predetermined degree of lost motion to occur as between the rotation of throttle lever 34 (as well as throttle valve 30) and initial movement of rod 114 and inner or second housing section 100 against the resilient resistance of spring 136.

Generally, in most instances, a throttle valve opening of approximately, for example, fifteen degrees (15%) is sufficient to provide the necessary power for adequately accelerating the associated vehicle from a standing condition to the desired city driving speeds. Such 15° of throttle opening is also usually sufficient to maintain vehicle speed, during normal roadload conditions, at approximately 55.0 to 60.0 m.p.h. For purposes of discussion, let it be assumed that the invention is so assembled, as illustrated in FIG. 1, as to provide for such assumed fifteen degrees of throttle opening movement before any movement or rod 114 is affected. (It should be explained that when degrees of throttle opening are referred to, such is made with reference to the position that the throttle assumes as its curb-idle position once normal engine operating temperature has been attained and that the measurement of such degrees of throttle opening is made with such curb-idle throttle position being the zero point).

With the preceding assumptions, as the vehicle operator starts to depress throttle foot pedal or lever 60, to cause it to rotate counterclockwise about pivot 62, such movement of the pedal 60, throttle lever 34 and throttle 30 is resiliently opposed by the throttle return spring 68 which is provided in every vehicle. During such initial throttle opening movement, arm 74 and member 76 continue to move generally away from assembly 92 thereby causing the predetermined "slack" in the chain connecting means 88 to be taken up. When the throttle valve 30 has been thusly rotated the assumed fifteen degrees in its opening direction, the predetermined degree of lost motion provided by lost motion connecting means 88 becomes totally consumed thereby causing the movement of rod 114 to occur upon further opening movement of throttle valve 30.

Assuming that the vehicle operator insists upon throttle opening beyond the assumed fifteen degree opening, any such further opening of the throttle valve 30 causes the application of a somewhat suddenly increased resilient force opposing such further throttle opening. The suddenly increased magnitude of the force opposing further throttle opening is due to the associated movement of rod 114 and the attendant compression of auxiliary spring 136 which upon deflection by rod 114 provides a change in the spring rate of the overall system with such change being sufficiently dramatic to provide a sensory feedback signal to the vehicle operator indicating to such operator that the throttle valve 30 has been opened to an excessive degree and that because of that the associated engine is consuming fuel at a rate higher than normally necessary.

It should be noted that the invention in no way prohibits the vehicle operator from opening the throttle valve 30 to any degree of opening desired or required thereby in no way presenting any hazard to the safe driving of the vehicle even under emergency conditions. The invention, however, does continually impress (by way of feedback signal) upon the vehicle operator that the operator is operating the associated engine in a manner causing wasteful fuel consumption. In other words, without in any way interfering with otherwise normal vehicle operation, the invention causes the operator to be made aware of when fuel is being consumed at a wasteful rate and at the same time causes the operator to acquire driving habits better suited for minimizing overall fuel consumption.

FIGS. 3 and 4 illustrate, in fragmentary views, a second embodiment of the invention. All elements which are like or similar to those of FIGS. 1 and 2 are identified with like reference numbers provided with a suffix "a".

In the embodiment of FIGS. 3 and 4, throttle lever 34a, although fuctionally similar to throttle lever 34 of FIG. 1, has a generally laterally or traversely extending bracket 140 carried thereby or integrally formed therewith with such bracket or flange 140 having an internally threaded aperture for the cooperative threaded reception therein of an axially threadably adjustable abutment or screw member 142. A coiled type auxiliary torsion spring 144, shown as situated generally about the throttle shaft 32a, has its one end 146 anchored as to a pin 148 secured to body 16a of induction device 10a. The other end 150 of spring 144 has an upwardly extending (as viewed in FIG. 3) tab-like portion 152 which normally resiliently abuts against a restraining-like pin member 154 operatively carried by body means 16a.

In the embodiment of FIGS. 3 and 4, linkage means 40a is operatively connected to the vehicle operator foot pedal 60 as illustrated in FIG. 1 so that opening and closing movements of the throttle valve means 30a are affected in the manner described with reference to FIG. 1. However, in the embodiment of FIGS. 3 and 4, functionally, spring means 144 and movable abutment screw 142 cooperatively replace the assembly 92 of FIG. 1 including the lost motion linkage means 88.

That is, when throttle valve means 30a is rotated a predetermined degree in the opening direction, abutment screw 142 abuts against flange-like portion 152 and upon further rotation of the throttle 30a in the opening direction, such screw 142 causes further coiling of the auxiliary spring means 144 with such coiling and such further opening of the throttle being resiliently resisted by the additional resilient force of spring means 144.

It should, of course, be apparent that screw 142 can be adjustably positioned with respect to lever 34a and flange 140 to thereby select the amount of opening that throttle valve 30a will be permitted to experience before operative engagement with spring means 144 is achieved and the additional resilient force provided thereby is experienced.

FIGS. 5, 6 and 7, in fragmentary views, illustrate a third embodiment of the invention. Elements in FIGS. 5, 6 and 7 which are like or similar to those of any of FIGS. 1-4 are identified with like reference numbers provided with a suffix "b".

In the embodiment of FIGS. 5, 6 and 7, a coiled torsion spring 160 is situated generally about throttle shaft 32b and has one end 162 retained as by and within a suitable recess or aperture 164 while a second end 166, on spring arm portion 168, projects generally laterally as to be generally in the path of movement of throttle lever 34b as such throttle lever is rotated during opening and closing movements of the throttle 30b.

A spring preload adjusting means 170 is illustrated as being comprised of a plate-like member 172 generally loosely received about throttle shaft 32b and axially situated as between throttle lever 34b and body 16b. Plate 172 is provided with a spring engagement arm 174 as well as an arcuate slot 176. As shown, arm 174 is adapted to engage spring arm projection 166 while slot 176 is adapted to have the shank of a screw 178 pass therethrough as to thereby enable screw 178 to be in threadable engagement with a cooperating aperture formed as within a stationary projection or boss 180.

As should be apparent, screw 178 may be loosened and plate 172 rotated, for example, clockwise generally about the axis of throttle shaft 32b and, in so doing, cause plate arm 174 to correspondingly move spring arm projection 166 thereby accordingly adjusting the degrees of angular rotation that both throttle valve 30b and throttle lever 34b will move, from a curb-idle position, before edge 182 of lever 34b abuts against and engages spring arm projection 166. It should also be apparent, in view of the preceding disclosure, that, if desired, a second adjustment plate functionally similar to plate 172 may be provided for similar engagement with end 162 of spring 160 in order to variably position the location of such end 162. In so doing, both the preload of the spring 160 as well as the lost motion (movement of throttle valve 30b prior to functional engagement with spring 160) may be readily and generally infinitely adjusted.

As with the embodiment of FIGS. 3 and 4, linkage means 40b is operatively connected to the vehicle operator throttle foot pedal 60 as shown in FIG. 1 and as described with reference thereto.

FIGS. 8 and 9, in fragmentary views, illustrate a further embodiment of the invention. Elements in FIGS. 8 and 9, which are similar to any of FIGS. 1-7, are identified with like reference numbers provided with a suffix "c".

In the embodiment of FIGS. 8 and 9, apparatus 184 is provided to cooperate with, for example, the throttle lever 34c. Such apparatus 184 is illustrated as comprising a mounting body or bracket 186 suitably secured, as by a flange portion 188, to related support structure 190 forming an integral part of the associated engine or carried thereby.

The bracket 186 is provided with a generally vertically extending wall 192 which, in turn, is provided with generally laterally or transversely extending arms or supports 194 and 196. Bracket arm 194 is provided with a threaded aperture 198 formed therein for the cooperative reception of the threaded shank of a screw 200 while bracket arm 196 is provided with, for example, a clearance aperture 202 for the passage therethrough of an extension 204, carried as by a screw 206, as well, if need be, as the passage therethrough of a portion of the shank of screw 206.

A generally laterally extending pivot member 208 suitably secured to and carried as by bracket wall 192, operatively pivotally carries a plate-like lever 210 which, in turn, is illustrated as being provided with an aperture 212, formed therethrough at the upper end thereof, as well as a laterally projecting post member 214 carried thereby.

As shown, a tension spring 216 is connected at one end 218 to post 214 while its other end 220 is operatively connected to extension 204 and screw 206. A nut 222 is threadably engaged with screw 206 and serves as both a stop or abutment means and a spring tension or preload adjusting means. That is, by threadably turning nut 222, which is abutting against bracket arm 196, both screw and extension 204 are axially positioned which, in turn, varies the preload spring force of spring means 216.

As best seen in FIG. 8, spring means 216 continually resiliently urges lever 210 counterclockwise about pivot means 208 as to thereby tend to resiliently maintain the upper end 224 of lever 210 abuttingly engaged against end 226 of screw 200 which serves as an adjustable stop member. That is, by threadable rotation of screw 200 within threaded aperture 198, the axial location of end 226 can be changed to whatever point it is desired that lever 210 be rotated when abutment means end 226 abuts against end 224 of lever 210.

Lost motion connecting means 230, as in the form of a ball-link chain, has one end 232 connected to lever 210, as through aperture 212, and a second end 234 connected to throttle lever 34c, as through an aperture 236.

As with regard to the embodiments of FIGS. 3-7, the linkage means 40c is operatively connected to the foot-operated throttle pedal 60 of FIG. 1 in accordance with the description relative thereto.

Accordingly, the operation of the invention as disclosed in FIGS. 8 and 9 is, generally, as previously described with reference to the preceding Figures. That is, as throttle pedal 60 (FIG. 1) is rotated counterclockwise, linkage means 40c causes throttle lever 34c and throttle valve means 30c to rotate clockwise about the center line of shaft 32c. As such rotation continues, the slack or lost motion within connecting means 230 continues to be consumed while lever 210 remains at rest against abutment means end 226. When throttle 30c and lever 34c have rotated clockwise a sufficient amount, the available lost motion within connecting means 230 simultaneously becomes expended thereby resulting in lever 210 rotating clockwise upon any additional clockwise rotation of throttle valve 30c.

As lever 210 is thusly rotated clockwise, it does so against the additional yieldable resistance of spring means 216 which has previously been adjusted to provide for a preselected spring preload force immediately effective upon initial clockwise movement of lever 210.

When throttle pedal 60 is released, throttle return spring means 68c rotates throttle lever 34c and throttle 30c counterclockwise until throttle 30c again reaches its curb idle position while spring means 216 assures the rotational return of lever 210 to the position depicted in FIG. 8.

FIG. 10, in fragmentary view, illustrates a further embodiment of the invention. Elements in FIG. 10 which are similar to any of FIGS. 1–9 are identified with like reference numbers provided with a suffix "d".

In the embodiment of FIG. 10, the throttle return spring 68d has its end 70d operatively connected as to a bracket 240 which has its base 242 secured to support means 190d formed on or carried by the associated engine. The other end 66d of spring 68d is operatively connected to throttle lever 34d and linkage 40d as through a common pivot connecting means 244 pivotally interconnecting lever 34d to throttle linkage means 40d.

End 220d of spring 216d is connected to threadably adjustable spring anchor means 206d which, in turn, extends through wall 246 of bracket 240. This is similar to the arrangement of FIG. 9; however, the other end 218d of spring 216d is connected, as by a connector 248, to one end of a ball-link chain motion transmitting means 250 which, in turn, has its other end 252 pivotally secured to throttle lever 34d as by pivot means 254. As with the previously described embodiments, linkage means 40d is operatively connected to the operator controlled foot throttle pedal 60 as typically disclosed in FIG. 1.

In the embodiment of FIG. 10, as throttle pedal 60 is rotated counterclockwise, linkage means 40d causes throttle lever 34d and throttle valve means 30d to rotate clockwise about the center line of shaft 32d. As such rotation continues, the slack or lost motion within connecting means 250 and spring 216d continues to be consumed. When throttle 30d and lever 34d have rotated clockwise a sufficient amount, the available lost motion within connecting means 250 and cooperating spring 216d simultaneously becomes expended thereby resulting in an additional spring force, because of the resilient resistance of spring means 216d, being applied to throttle lever 34d for any movement, in the clockwise direction, of throttle valve 30d and lever 34d beyond the predetermined said sufficient amount.

FIGS. 11, 12 and 13, in fragmentary views, illustrate a further embodiment of the invention. Elements in FIGS. 11, 12 and 13 which are similar to any of FIGS. 1–10 are identified with like reference numbers provided with a suffix "f".

In FIG. 11, a suitable mounting member 260 is suitably secured to related support means 190f integrally formed with or carried by said associated engine. A first pivot member 262 pivotally secures a reaction type lever 264 to mounting member 260 while a second pivot member 266 pivotally secures a cam plate-like body 268 also to mounting member 260. As best seen in FIG. 11, cam body 268 has a contoured cam surface or edge 270 formed therein against which a roller or cam follower 272 is urged as by spring means 274. That is, cam roller 272, which may be formed with axially oppositely disposed disc-like guides 276 and 278 of diameters larger than that of roller 272, is pivotally secured to the upper swingable end 280 of lever 264 as by pivot means 282. Spring means 274, in turn, has one end 284 operatively connected to pivot means 282 while its other end 286 is connected to a spring post 288 secured to cam body 268.

Suitable motion transmitting means, such as, for example, a ball-link type chain 290, has a first end 292 operatively connected to cam body 268, as by or through a suitable post 294 secured to cam body 268, and a second end 296 pivotally secured as at 254f to throttle lever 34f. As with regard to the previous embodiments of FIGS. 3–10, linkage means 40f is operatively connected to the operator controlled foot throttle pedal 60.

Accordingly, as throttle pedal 60 is rotated counterclockwise, linkage means 40f causes throttle lever 34f and throttle valve means 30f to rotate clockwise about the center line of shaft 32f. As such rotation occurs agains the resilient resistance of spring 68f, motion transmitting means 290 causes clockwise rotation of cam body 268 and cam surface 170. In the embodiment shown, the radially innermost edge of cam surface 270, for the most part, is illustrated as being a segment concentric to the center line of pivot means 266. Therefore, as cam body 268 so rotates, cam follower wheel 272 does not move either generally toward or away from the center line of pivot means 266. However, when throttle lever 34f and throttle valve 30f have been thusly rotated a preselected amount, follower wheel 272 engages the contoured rise portion 273 of cam surface 270 and any further rotation, in the opening direction, of throttle valve 30f (and corresponding rotation of cam plate 268) will result in follower wheel 272 swinging generally counterclockwise about pivot means 262 against the added resilient resistance of spring means 274.

Depending on the selected configurations of the respective cooperating elements, cam body 268 may rotate (through the full range of throttle opening movement) to the extent that follower wheel 272 would eventually ride along surface or edge 275 which could be made concentric to the center line of pivot means 266. Obviously, if such were the case, then once follower wheel 272 did start riding along such concentric portion, additional opening movement of the throttle valve would not result in any further resilient deflection of spring means 274. However, it is also contemplated that both cam surface portion 273 and surface 275 may be so contoured as to provide any desired relationship, whether uniform or non-uniform, as between angular change of position of throttle valve means 30f and deflection of spring means 274.

FIGS. 14–17 illustrate a further embodiment of the invention. Elements in FIGS. 14–17 which are like or similar to elements of FIGS. 1–13 are identified with like reference numbers provided with a suffix "g".

As best seen in FIGS. 14 and 15, a second bracket-like support 300, suitably received to associated support structure 190g, carries a pivot member 302 which, in turn, pivotally supports a lever 304. In the embodiment illustrated, for ease and clarity of disclosure, pivot members 208g and 302 are shown as being in axial alignment with each other; however, as should be evident from the entire disclosure, such is, of course, not required to practice the inventive concepts disclosed. As viewed in FIG. 14, lever 304 is generally freely pivotally swingable about the axis of pivot means 302 in both the clockwise and counter-clockwise directions. Similarly, lever 210g is swingable about the axis of pivot means 208g with the exception that when lever 210g is moved clockwise it does so against the resilient resistance of spring means 216g.

Lever 304 is operatively connected to throttle lever 34g as by rod-like linkage means 306 which has its opposite ends 308 and 310 respectively pivotally connected to levers 304 and 34g. The upper end of lever 210g carries a generally transversely extending abutment arm portion 312 while, similarly, upper end of lever 304 carries a generally transversely extending abutment arm portion 314. When levers 304 and 210g assume relative positions as illustrated in FIGS. 14 and 15, surface 316 of lever arm portion 314 abuts against surface 318 of lever arm portion 312. For ease and clarity of description, it is assumed that linkage means 40g has rotated throttle lever 34g and throttle valve 30g to the preselected degree of opening after which any further opening would cause the application of a decidedly increased magnitude of resilient resistance. Such assumed rotation of throttle lever 34g, in turn, through linkage means 306 has caused lever 304 to be rotated clockwise as to place its abutment surface 316 in abuting relationship to surface 318 of lever 312 and in a plane or position generally depicted by line 320. When throttle valve 30g and throttle lever 34g are returned to curb idle position, lever 304 will have been rotated counter-clockwise from the position illustrated as to place its abutment surface in a position generally depicted by line 322.

In any event, once lever 304, through linkage means 306, has been rotated to the position shown, any further opening movement of throttle lever 34g and throttle valve 30g will cause lever 304 to rotate lever 210g clockwise about the axis of pivot means 208g against the added resilient resistance provided by spring means 216g. It should be apparent that although lost motion connecting or producing means may be provided in numerous ways, the lost motion in the embodiment of FIG. 14 is provided by the angular distance between lines 322 and 320 and such angular distance can be varied to suit the particular application and needs merely by adjusting the position of line 320 (representing an abutting condition) which is accomplished by adjustment screw 200g acting upon lever 210g to determine its at rest or stopped position. This, of course, as previously explained with reference to FIGS. 8 and 9, in no way precludes corresponding adjustment, if desired, of the preload force of spring means 216g through adjustment means 206g.

The overall operation of the embodiment disclosed by FIGS. 14 and 15 is, of course, as that previously described with reference to the other embodiments. However, the invention as disclosed by FIGS. 14 and 15, has additional features which makes it particularly suited to vehicles which are provided with operator actuated or initiated vehicle speed governors of the selector type. Such are often referred to as "cruise controls" permitting the vehicle operator to dial or otherwise select the desired vehicle speed and upon actuation of, for example, related control means cause such a "cruise control" to maintain the vehicle speed so selected. Some of such "cruise controls" employ various spring means within the overall system for biasing certain components. Accordingly, the continued application of the spring force, provided by spring means 216g, to the throttle positioning means during periods of vehicle operation wherein such a "cruise control" is activated to maintain a selected vehicle speed, might result in altering the responsiveness of the "cruise control" to variations in vehicle speed. Therefore, in such applications, it is preferred that while the "cruise control" is activated the additional spring force, as provided by spring means 216g, not be applied to the throttle positioning means.

Accordingly, suitable means 330, carried by bracket support 300, is provided for causing selective disengagement as between levers 304 and 210g. That is, pivot means 302, even though of any suitable form, is illustrated as being comprised of a ball joint assembly having a ball portion 332 situated as within a cooperating ball rocket 334 carried by lever 304. Consequently, lever 304 actually has multi-directional movement capabilities with respect to the pivot means 302.

Lever 304 has an arcuate slot 336 (preferably a segment of a circle having its centerline coincident with the axis of pivot means 302) formed therethrough as to freely receive a guide or rod-like portion 338 the axial position of which is determined by means 330. In the embodiment shown, means 330 takes the form of pressure responsive motor means having housing sections 340 and 342 which cooperatively peripherally retain a movable pressure responsive diaphragm or wall member 344 therebetween as to generally define on opposite sides thereof distinct but variable chambers 346 and 348 with chamber 346 being suitably vented as to atmosphere while chamber 348 is adapted, via conduit portion 350, for communication with a source of relatively low pressure as, for example, occurs within the intake manifold 352 of the associated internal combustion engine 354. As generally schematically depicted in FIG. 1, conduit portion 350 is operatively connected to the interior of the intake manifold 352 as by conduit means 356 and 358 with suitable interposed control means 360 which functions to complete communication between conduits 356 and 358 whenever the vehicle operator activates the related "cruise control" thereby placing chamber 348 at subatmospheric pressure.

When chamber 348 is thusly at subatmospheric pressure, diaphragm 344 moves against the resilient resistance of a spring 361 and, in so doing, moves diaphragm rod 338 downwardly (as viewed in FIG. 15). As rod 338 so moves, a clip-like retainer (or equivalent structure) 362 carried by rod 338 abuttingly engages the side of lever 304 and causes lever 304 to pivot generally sideways and away from lever 210g so as to place lever arm portion 314 in a position such that its path of travel, when rotated either clockwise or counterclockwise (as viewed in FIG. 14) about the axis of pivot means 302, will not include arm portion 312 of lever 210g. Consequently, during engine operation under the influence and control of related "cruise control" means, the loading of spring means 216g will not become a factor in the overall operation since lever 304 will swing freely with throttle lever 35g.

When the "cruise control" means is deactivated, the related control means 360 of FIG. 1 causes a termination of the communication between conduit means 356 and 358 with attendant venting of chamber 348. When this occurs, spring 361 returns diaphragm rod 338 which, through abutment or clip member 364 carried thereby, moves lever 304 to the position illustrated as to cause lever arm portions 314 and 312 to be generally in the same path of travel.

Preferably, cam type means such as a ramp portion 366 is carried by arm 314. This is provided so that in the event lever 304 is returned but such return occurs while lever arm portion 314 is angularly to the right of lever arm portion 312 (as viewed in FIG. 14) such arm portions 312 and 314 will not lock against each other and prevent normal return of the throttle valve 30g to its curb idle position. Cam portion 366 would, in such an instance, cause lever 304 to transversely angularly deflect past arm portion 312 and assume its proper relative position. In the preferred embodiment, suitable stop means 368, as in the form of a tubular, is provided as to determine the transverse angular position of lever 304 when the "cruise control" is de-activated.

Although the embodiment of FIGS. 14 and 15 has been illustrated employing pressure responsive means 330, such could as should be apparent, be replaced by other actuating means such as, for example, solenoid means also made operative during periods of engine operation under "cruise control".

Although only a select number of preferred embodiments and modifications of the invention have been disclosed and described, it is apparent that other embodiments and modifications of the invention are possible within the scope of the appended claims.

I claim:

1. Resilient throttle stop apparatus for use in combination with a combustion engine wherein said engine comprises an intake structure, induction passage means, formed in said intake structure, and throttle valve means for controlling flow through said induction passage means, said throttle stop apparatus comprising first resilient means, second resilient means, said induction passage means being fixedly secured to and supported by said engine, said first resilient means being operatively connected to said throttle valve means as to apply thereto a first resilient force for urging said throttle valve means in a closing direction, and said second resilient means being effective regardless of whether or not said engine is operating to at times exhibit an added resilient resistance force resisting further opening movement of said throttle valve means by associated throttle lever means after said throttle valve means has been opened to a preselected degree, said second resilient means said induction passage means said throttle valve means and said connecting means all being commonly supported by said engine, said second resilient means comprising torsion spring means preloaded as to cause said added resilient resistance force to be of a preselected minimum value upon initiation of said further opening movement, wherein said spring means comprises a generally angularly deflectable end, and wherein said throttle lever means operatively engages and angularly deflects said deflectable end upon said initiation of said further opening movement.

2. Resilient throttle stop apparatus according to claim 1 and further comprising spring preload adjustment means, said spring preload adjustment means comprising a variably positionable spring deflecting lever effective for engaging said deflectable end and angularly displacing said deflectable end as to thereby selectively vary the magnitude of said preselected degree of throttle valve opening.

3. Resilient throttle stop apparatus according to claim 1 wherein said throttle lever means operatively engages said angularly deflectable end through associated spring-engaging means movable in unison with said throttle lever means and effective for engaging and angularly deflecting said deflectable end upon said initiation of said further opening movement.

4. Resilient throttle stop apparatus according to claim 3 wherein said spring-engaging means comprises selectively positionably adjustable abutment means operatively carried by said throttle lever means.

5. Resilient throttle stop apparatus according to claim 1 and further comprising retainer means effective for operatively engaging said deflectable end and preventing said deflectable end to move generally in unison with said throttle valve means as said throttle valve means is moving toward a throttle position which is more nearly closed than said preselected degree.

6. Resilient throttle stop apparatus according to claim 5 wherein said retainer means is selectively adjustable.

7. Resilient throttle stop apparatus according to claim 1 wherein said throttle lever means further comprises angularly rotatable shaft means, wherein said shaft means operatively carries said throttle valve means for movement therewith, and wherein said torsion spring means is coiled generally about the axis of rotation of said shaft means.

* * * * *

UNITED STATES PATENT OFFICE
CERTIFICATE OF CORRECTION

Patent No. 4,094,281　　　　　　　　Dated June 13, 1978

Inventor(s) MILTON J. KITTLER

It is certified that error appears in the above-identified patent and that said Letters Patent are hereby corrected as shown below:

Column 10, line 21, change "agains" to --- against ---.

Column 10, line 23, change "170" to --- 270 ---.

Signed and Sealed this

Twenty-first Day of November 1978

[SEAL]

Attest:

RUTH C. MASON
*Attesting Officer*

DONALD W. BANNER
*Commissioner of Patents and Trademarks*